United States Patent [19]
Stedman

[11] Patent Number: 5,544,930
[45] Date of Patent: Aug. 13, 1996

[54] FLOATING END STRUCTURAL REINFORCEMENT FOR A VEHICLE DOOR

[75] Inventor: Dennis F. Stedman, Ortonville, Mich.

[73] Assignee: Chrysler Corporation, Auburn Hills, Mich.

[21] Appl. No.: 318,403

[22] Filed: Oct. 5, 1994

[51] Int. Cl.[6] ........................................ B60J 5/04
[52] U.S. Cl. ........................ 296/146.6; 296/189; 403/282
[58] Field of Search ................................ 296/146.6, 188, 296/189; 403/279, 281, 282; 49/502; 52/660, 664, 735.1

[56] References Cited

U.S. PATENT DOCUMENTS

| | | | |
|---|---|---|---|
| 5,094,034 | 3/1992 | Freeman | 49/501 |
| 5,180,204 | 1/1993 | Shirasawa et al. | 296/146.6 |
| 5,203,436 | 4/1993 | Wieting et al. | 296/189 |
| 5,277,469 | 1/1994 | Klippel | 296/146.6 |
| 5,429,410 | 7/1995 | Fleischer | 296/146.6 |

*Primary Examiner*—Andrew C. Pike
*Attorney, Agent, or Firm*—Margaret A. Dobrowitsky

[57] ABSTRACT

A structural reinforcement for a vehicle door has an energy absorbing tubular bar, a first bracket, and a second bracket. The tubular bar extends substantially across a length of the vehicle door approximately parallel to a lower edge of the door. The tubular bar has a first end and a second end and a longitudinal axis passing through the first end and the second end. The first bracket retains the first end of the tubular bar such that there is a predetermined amount of rotational float between the first bracket and the first end of the bar. The second bracket has a seat portion receiving and fixed to the second end of the bar.

14 Claims, 2 Drawing Sheets

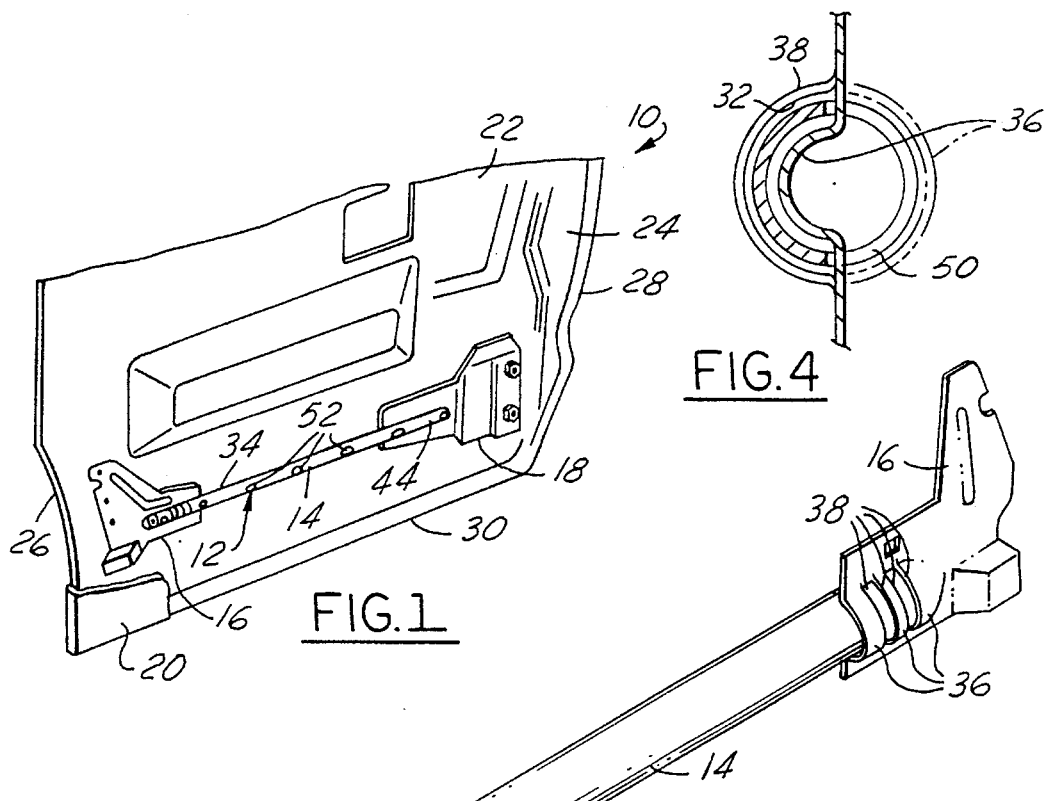

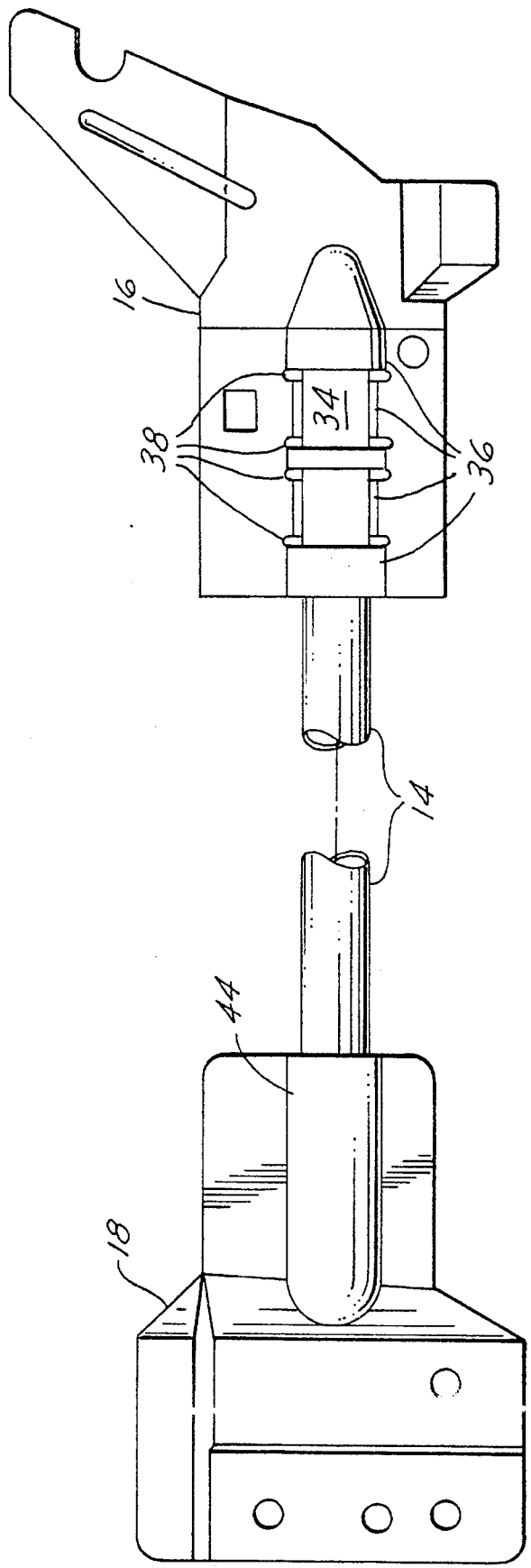
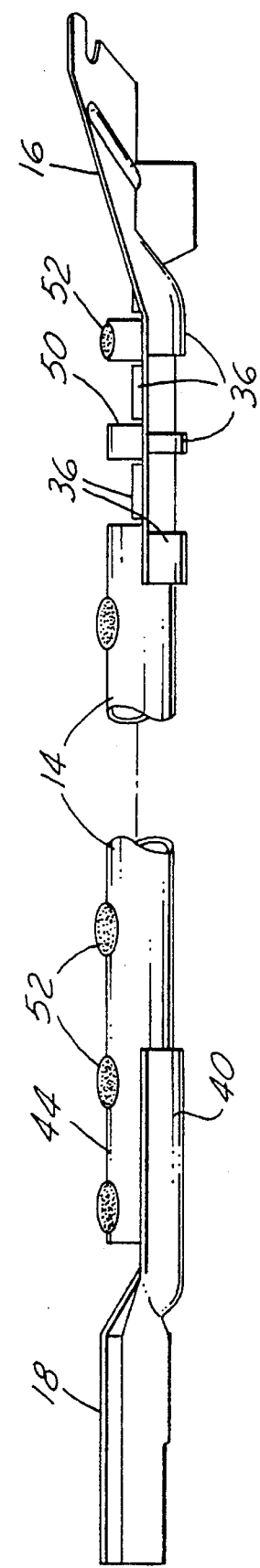
FIG. 6
FIG. 7

5,544,930

FLOATING END STRUCTURAL REINFORCEMENT FOR A VEHICLE DOOR

TECHNICAL FIELD

The present invention relates generally to vehicle body structures for motor vehicles, and more particularly to structural reinforcements in motor vehicle doors to protect against side impact intrusion.

BACKGROUND OF THE INVENTION

Structural reinforcements are commonly employed within motor vehicle doors to provide some level of protection against intrusion into the passenger compartment by objects impinging against the vehicle door. A common form of door reinforcement is a metal stamping which is welded to the interior of the door.

Welding the reinforcement to the door commonly induces significant distortion of the door. The metal stamping may vary from its nominal shape due to the "spring back" phenomenon associated with stamping operations. Distorted reinforcements are forced to their nominal shape for welding to the door. When the door and the reinforcement assembly are subsequently released, the reinforcement reacts against the door, causing it to twist. Additional door distortion may be introduced by the heating effect of the high temperatures associated with welding on the stamping. Doors so distorted are one source of alignment problems between the door assembly and a surrounding body structure door frame.

It is known to provide a structural reinforcement which is free to rotate relative to the door at both ends. One such reinforcement has an elongated tubular bar mounted to the door by trapping enlarged ends of the bar in conical sleeves at the ends or edges of the door. Because the ends are free to rotate, the reinforcement introduces effectively no torsional distortion of the door. Upon loading, the bar deflects, reacting against the sleeve. Increased loading results in increased distortion of the sleeves. This design, however, is sensitive to variations in both distance between the sleeves and the length of the reinforcement. Slight variations in either the length of the reinforcement, or the distance between the sleeves, significantly affects the resultant impact resistance of a door with this type of reinforcement. An axially loose assembly would result in additional bar deflection being sustained before sleeve deflection is initiated. This would likely result in a lower reinforcement strength and a significantly greater amount of intrusion into the passenger compartment for a given impact force than would an assembly with minimal variance between the reinforcement ends and the associated brackets.

It is desired to provide a structural reinforcement for a vehicle door inducing no distortion of the door upon installation and providing a resistance to intrusion relatively insensitive to the installation process.

SUMMARY OF THE INVENTION

In one aspect of the present invention, a floating end structural reinforcement for a vehicle door is disclosed comprising an energy absorbing tubular bar, a first bracket, and a second bracket. The tubular bar extends substantially across a length of the vehicle door approximately parallel to a lower edge of the door. The tubular bar has a first end and a second end and a longitudinal axis passing through the first end and the second end. The first bracket retains the first end of the tubular bar. The second bracket has a seat portion receiving and fixed to the second end of the bar.

In another aspect of the present invention, a motor vehicle door is disclosed comprising an inner door panel, an energy absorbing tubular bar, a first bracket, and a second bracket. The inner door panel defines a length of the door between a first vertical edge of the door and a second vertical edge of the door. The energy absorbing tubular bar has a first end and a second end and a longitudinal axis passing therethrough, and extends substantially across the length of the door approximately parallel to a lower edge of the door. The first bracket is fixed to the inner panel proximate to the first edge of the door and retains the first end of the tubular bar. The second bracket is fixed to the inner panel proximate to the second edge of the door. The second bracket has a seat portion receiving and fixed to the second end of the bar.

In yet another aspect of the invention, a floating end structural reinforcement for a vehicle door is disclosed comprising an energy absorbing beam, a first bracket, and a second bracket. The beam extends substantially across a length of the vehicle door substantially parallel to a lower edge of the door. The beam has a first end and a second end and a longitudinal axis passing through the first end. The first end has a slot of a first width. The first bracket has a slit defining a receiving member of a width substantially equal to the first width of the slot. The receiving member receives the first end of the beam. The slot receives the receiving member which is pressed into the slot. The first end of the bar is able to rotatively float relative to the first bracket. The second bracket receives the second end of the bar.

The present invention provides a structural reinforcement for vehicle doors which is fixed to a single end of the door on a first end and is allowed to float relative to a second end of the door at a second end thereof. This floating relationship prevents any introduction of torsional twist forces into the door during the installation of the reinforcement. The resultant resistance of the door to intrusion is substantially insensitive to assembly variations in both the distance between the first and second brackets as well as the length of the energy absorbing tubular bar.

BRIEF DESCRIPTION OF THE DRAWINGS

FIG. 1 is a perspective view lower portion of a vehicle sliding door with a section broken out of an outer door panel to expose a structural reinforcement of the present invention.

FIG. 2 is a perspective pictorial view of the structural reinforcement of the present invention as viewed from a position inside the vehicle.

FIG. 3 is a perspective view of the structural reinforcement of the present invention as viewed from a position outside the vehicle.

FIG. 4 is a sectional view of an energy absorbing tubular bar and a first bracket taken substantially along lines 4–4 of FIG. 3.

FIG. 5 is a broken out section of a first end of the energy absorbing tubular bar of the present invention.

FIG. 6 is a side view of the structural reinforcement of the present invention.

FIG. 7 is a top view of the structural reinforcement of the present invention.

DETAILED DESCRIPTION OF THE PREFERRED EMBODIMENT

A sliding vehicle door assembly 10 illustrates a first embodiment of an energy absorbing structural reinforcement 12 for the door assembly 10. The reinforcement 12 in its most basic parts comprises an energy absorbing beam 14, a first bracket 16, and a second bracket 18. The door assembly 10 also includes an outer panel 20 providing a surface seen from the exterior of the vehicle and an inner panel 22 providing a supporting door structure 24 beneath the outer panel 20. The door has a first vertical edge 26 and a second vertical edge 28. The second or forward vertical edge 28 of the door 10 is where the latch or lock mechanism and a sliding door roller mechanism (not shown) are typically located. The first or rearward vertical edge 26 of the door assembly 10 is opposite the second edge 28, near a lower edge 30 of the door assembly 10. The lower edge 30 of the door 10 runs between the first vertical edge 26 and the second vertical edge 28.

In the present embodiment, the exemplary beam 14 is provided by an energy absorbing tubular bar 14.

The first bracket 16 in this exemplary embodiment has an axial passage 32 for receiving a first end 34 of the tubular bar 14. The first bracket 16 of this embodiment is a unitary stamping formed of sheet metal with the axial passage 32 defined by alternating oppositely directed arcuate portions, or receiving members 36. Four slits 38 separate the arcuate portions. Three of the arcuate portions 36 are bowed inward and two are bowed outward, as shown in phantom in FIG. 4, forming the axial passage 32 and receiving the first end 34 of the energy absorbing tubular bar 14.

The second bracket 18 is also a unitary stamping of sheet metal. The bracket 18 has a seat portion 40 with a longitudinal arcuate shape bowing inward and adapted to receive an inner portion 42 of a second end 44 of the bar 14 opposite the first end 34. The second end 44 of the bar 14 is placed in the seat portion 40 and welded therein. Weld nuts 46 are provided to fix the roller mechanism for the sliding door lower track to the door assembly 10.

The energy absorbing tubular bar 14 has a longitudinal axis 48 passing through the ends 34 and 44. The exemplary bar 14 is formed of steel. The energy absorbing tubular bar 14 has a pair of adjacent radial slots 50 in the first end 34 of the tubular bar 14. The slots 50 arc across an angle of approximately 180°. The slots 50 are axially spaced and oriented to be alignable with the outer arcuate portions 36 of the first bracket 16. With the radial slots 50 aligned with the outer arcuate portions 36, the outer arcuate portions 36 are deflected inward into the slots 50 as illustrated in FIGS. 3 and 4, capturing the first end 34 of the tubular bar 14 in the first bracket 16. The deflection of the arcuate portion 36 is limited to provide rotational float between the first bracket 16 and the bar 14. The range of motion or float available between the bracket 16 and the bar 14 is selected to accommodate the expected variation between the assembled reinforcement 12 and the door assembly 10. This prevents the development of any distorting force with the installation of the reinforcement 12. Axial float within the reinforcement 12 is provided by making the slots 50 greater in width than the width of the arcuate portions 36. It is anticipated that this joining of the bracket 16 to the tubular bar 14 would be performed before mounting the first bracket 16 to the inner panel 22.

To install the assembled structural reinforcement 12 in the door assembly 10, the reinforcement 12 is positioned against the inner panel 22. The second bracket 18 is spot welded to the inner panel 22 proximate to the second edge 28 of the door 10. The first bracket 16 is spot welded to the inner panel 22 proximate to the first vertical edge 26. The brackets 16 and 18 can alternatively be welded in the opposite order, or can be welded in place simultaneously. Eight drops 52 of structural adhesive, about 25 mm (1 inch) in diameter, are placed on an outwardly facing side of the tubular bar 14. The adhesive bonds to the outer skin or panel 20 when the outer skin 20 is fixed to the inner panel 22.

When an object impinges against the door assembly 10, and subsequently against the bar 14, the bar 14 deflects inward, bowing between the first and second brackets 16, 18. When the bar 14 deflects, the slots 50 decrease in size to fix the first bracket 16 to the bar 14, thereby increasing the resistance of the reinforcement 12 to further deflection.

It is to be appreciated that although only tubes 14 are illustrated as beams for the present invention, alternative cross sections could be employed for the beam, such as a top-hat cross section shape. Additionally, it might be desirable in some circumstances to attach the second bracket 18 to the bar 14 in the same manner as the first bracket 16.

The energy absorbing structural reinforcement 12 presented herein provides protection against passenger compartment intrusion while inducing no torsional twist into the door in the assembly process. Additionally, the ability of the present invention to sustain impacts is highly insensitive to positioning related manufacturing variations and further is very easily installed in the door assembly 10.

Other aspects, objects, and advantages of this invention can be obtained from a study of the drawings, the disclosure, and the appended claims.

I claim:

1. A floating end structural reinforcement for a vehicle door, the floating end structural reinforcement comprising:
   an energy absorbing tubular bar sufficiently long to extend substantially across a length of the vehicle door in a direction approximately parallel to a lower edge of the door and having a first end and a second end and a longitudinal axis passing through the first end and the second end;
   a first bracket retaining the first end of the tubular bar wherein the bracket has a predetermined amount of rotational float relative to the bar; and
   a second bracket having a seat portion receiving and fixed to the second end of the bar.

2. A floating end structural reinforcement as claimed in claim 1, wherein the first bracket defines an axial passage receiving the first end of the bar.

3. A floating end structural reinforcement as claimed in claim 1, wherein the bar has an engaging feature on the first end adapted to engage a complementary feature of the first bracket.

4. A floating end structural reinforcement as claimed in claim 1, wherein the first bracket is a metal stamping with a plurality of slits separating arcuate portions bowing outwardly in opposite directions from the bracket with at least one of the arcuate portions engaging a radial slit in the first end of the bar.

5. A floating end structural reinforcement as claimed in claim 4, wherein the first bracket is deformable from a first shape axially receiving the first end of the bar to a second shape axially trapping the first end of the bar.

6. A motor vehicle door comprising:
   an inner door panel defining a first vertical edge of the door and a second vertical edge of the door and a lower edge of the door extending therebetween;
   an energy absorbing tubular bar having a first end and a second end and a longitudinal axis passing through the first end and the second end and extending substantially across the door approximately parallel to the lower edge;

a first bracket loosely retaining the first end of the tubular bar and fixed to the inner panel proximate to the first edge of the door wherein the bar has a predetermined amount of rotational float relative to the bracket when the second end is free; and a second bracket being fixed to the inner panel proximate to the second edge of the door having a seat portion receiving and fixed to the second end of the bar.

7. A door as claimed in claim 6, wherein the first end of the bar is axially retained by the first bracket.

8. A door as claimed in claim 6, wherein the first bracket defines an axial passage receiving the first end of the bar.

9. A door as claimed in claim 6, wherein the bar has an engaging feature on the first end adapted to engage a complimentary feature of the first bracket.

10. A door as claimed in claim 6, wherein the first bracket is a metal stamping with a plurality of slits separating arcuate portions bowing outwardly in opposite directions from the bracket with at least one of the arcuate portions engaging a radial slit in the first end of the bar.

11. A door as claimed in claim 10, wherein the first bracket is deformable from a first shape axially receiving the first end of the bar to a second shape axially trapping the first end of the bar.

12. A floating end structural reinforcement for a vehicle door, the floating end structural reinforcement comprising:

an energy absorbing beam sufficiently long to extend substantially across a length of the vehicle door in a direction approximately parallel to a lower edge of the door and having a cylindrical first end and a second end and a longitudinal axis passing through the first end and including a slot in the first end of the beam of a first width and approximately normal to the axis;

a first bracket having at least one slit defining a receiving member of the bracket with a width substantially equal to the first width wherein the receiving member receives the first end of the beam and the slot in the beam receives the receiving member which is pressed into the slot wherein the first end of the bar can rotatively float relative thereto; and a second bracket receiving the second end of the bar.

13. A floating end structural reinforcement as claimed in claim 12, wherein the slot is greater than the receiving member in width, thereby providing axial float between the first end of the bar and the first bracket in addition to the rotative float.

14. A floating end structural reinforcement as claimed in claim 12, wherein there are two slots in the beam and the first bracket has two receiving members wherein one is disposed in each of the slots.

* * * * *